(12) United States Patent
Takashima et al.

(10) Patent No.: US 9,884,642 B2
(45) Date of Patent: Feb. 6, 2018

(54) STEERING DEVICE

(75) Inventors: Toru Takashima, Susono (JP);
Yoshiaki Tsuchiya, Miyoshi-cho (JP);
Theerawat Limpibunterng, Bangplee (TH)

(73) Assignee: TOYOTA JIDOSHA KABUSHIKI KAISHA, Toyota-shi (JP)

( * ) Notice: Subject to any disclaimer, the term of this patent is extended or adjusted under 35 U.S.C. 154(b) by 520 days.

(21) Appl. No.: 14/364,812

(22) PCT Filed: Dec. 12, 2011

(86) PCT No.: PCT/JP2011/078732
§ 371 (c)(1),
(2), (4) Date: Nov. 25, 2014

(87) PCT Pub. No.: WO2013/088502
PCT Pub. Date: Jun. 20, 2013

(65) Prior Publication Data
US 2015/0068833 A1 Mar. 12, 2015

(51) Int. Cl.
*B62D 5/04* (2006.01)
(52) U.S. Cl.
CPC .......... *B62D 5/0409* (2013.01); *B62D 5/046* (2013.01); *B62D 5/0463* (2013.01)
(58) Field of Classification Search
CPC ..... B62D 5/0409; B62D 5/0463; B62D 5/046
See application file for complete search history.

(56) References Cited

U.S. PATENT DOCUMENTS

| 5,698,956 A * | 12/1997 | Nishino | B62D 5/0463 180/443 |
|---|---|---|---|
| 8,684,129 B2 | 4/2014 | Terada et al. | |
| 2004/0083822 A1* | 5/2004 | Mukai | B62D 5/0463 73/862.195 |
| 2004/0210365 A1* | 10/2004 | Tanaka | B62D 5/0409 701/41 |
| 2006/0288800 A1* | 12/2006 | Mukai | B62D 5/046 73/862.326 |

(Continued)

FOREIGN PATENT DOCUMENTS

EP  2 447 134 A1  5/2012
JP  8-175406  7/1996

(Continued)

OTHER PUBLICATIONS

International Search Report dated Mar. 13, 2012, in PCT/JP2011/078732, filed Dec. 12, 2011.

*Primary Examiner* — Tony H Winner
*Assistant Examiner* — Gabriela C Craciun
(74) *Attorney, Agent, or Firm* — Oblon, McClelland, Maier & Neustadt, L.L.P.

(57) ABSTRACT

In order to provide a steering device capable of inhibiting generation of abnormal sound without a complicated structure, the steering device is provided with a wheel gear connected to an output shaft which transmits an output to a turning wheel and a worm gear engaging with the wheel gear and capable of transmitting power generated by a motor to the wheel gear, and a rotational speed of the motor is made lower than that during normal operation, at the time driving of the stopped motor is started or at the time a rotational direction of the worm gear is reversed.

16 Claims, 6 Drawing Sheets

(56) References Cited

U.S. PATENT DOCUMENTS

| | | | |
|---|---|---|---|
| 2007/0017735 A1* | 1/2007 | Kataoka | B62D 5/0463 180/446 |
| 2007/0250235 A1* | 10/2007 | Nakai | B62D 5/003 701/43 |
| 2008/0047775 A1* | 2/2008 | Yamazaki | B62D 5/0463 180/443 |
| 2009/0157261 A1* | 6/2009 | Yamazaki | B62D 5/0466 701/42 |
| 2009/0283354 A1* | 11/2009 | Matsuda | B62D 5/008 180/446 |
| 2011/0022268 A1* | 1/2011 | Kojo | B62D 5/008 701/41 |
| 2011/0057510 A1* | 3/2011 | Yamashita | B60L 1/003 307/10.1 |
| 2011/0094821 A1* | 4/2011 | Aoki | B62D 5/046 180/446 |
| 2011/0264326 A1* | 10/2011 | Iwasaki | B62D 5/046 701/41 |
| 2011/0272205 A1* | 11/2011 | Fujimoto | B62D 5/046 180/446 |
| 2011/0303479 A1* | 12/2011 | Mukai | B62D 5/0472 180/444 |
| 2011/0313620 A1* | 12/2011 | Mukai | B62D 5/008 701/41 |
| 2012/0035810 A1* | 2/2012 | Mukai | B62D 5/008 701/41 |
| 2012/0090913 A1* | 4/2012 | Terada | B62D 5/046 180/446 |
| 2012/0111657 A1* | 5/2012 | Hamakita | B62D 5/0409 180/444 |
| 2012/0203431 A1* | 8/2012 | Kojo | B62D 15/025 701/41 |
| 2013/0190988 A1* | 7/2013 | Limpibunterng | B62D 5/008 701/42 |
| 2013/0304327 A1* | 11/2013 | Morishita | B62D 5/0463 701/43 |
| 2013/0311045 A1* | 11/2013 | Tanimoto | B62D 15/0245 701/42 |
| 2013/0338887 A1* | 12/2013 | Kubina | B60W 10/11 701/54 |
| 2014/0149000 A1* | 5/2014 | Tamura | B62D 5/0481 701/42 |
| 2015/0075899 A1* | 3/2015 | Kikuchi | B62D 5/0409 180/444 |

FOREIGN PATENT DOCUMENTS

| | | |
|---|---|---|
| JP | 2004-358985 | 12/2004 |
| JP | 2005-329897 | 12/2005 |
| JP | 2007-166861 A | 6/2007 |
| JP | 2008-183990 | 8/2008 |
| JP | 2008-189172 | 8/2008 |
| JP | 2011-25913 | 2/2011 |
| JP | 2011-105272 A | 6/2011 |

\* cited by examiner

STEERING DEVICE

FIELD

The present invention relates to a steering device.

BACKGROUND

As an operating device mounted on a recent vehicle, that uses power generated by a motor is widely used in order to reduce operation force at the time of driving operation of a driver. For example, in an electric power steering device disclosed in Patent Literature 1, a decelerating mechanism and a pinion shaft of the motor are attached to an output shaft which outputs steering force to a steering wheel operated by the driver to a side of a rack-and-pinion transmission mechanism so as to be integrally rotatable. According to this, when the driver steers the steering wheel, the motor is driven and rotational torque transmitted from the output shaft to the side of the rack-and-pinion transmission mechanism is increased, so that a burden of the driver in the steering is reduced.

CITATION LIST

Patent Literature

Patent Literature 1: Japanese Patent Application Laid-open No. 2008-189172

SUMMARY

Technical Problem

Herein, the steering device which assists the steering force of the driver is provided with the decelerating mechanism which transmits the rotational torque generated by the motor to the output shaft; since there is certain backlash in a plurality of gears included in the decelerating mechanism, abnormal sound might be generated due to the backlash. In order to inhibit the abnormal sound, in the electric power steering device disclosed in Patent Literature 1, a spring member corresponding to each tooth of the gear is provided on one of the gears engaging with each other and the spring member is brought into contact with the tooth of the other gear. According to this, the spring member provides a buffer at the time of the contact of the teeth, thereby inhibiting the generation of the abnormal sound.

However, when the spring member is provided in order to inhibit the abnormal sound due to the backlash of the teeth, it is required to arrange the spring member for each of a countless number of teeth formed on the gear, so that assembly becomes more difficult and the number of components might be increased. In this manner, when the backlash of the gears is mechanically reduced in order to inhibit the abnormal sound, a structure is likely to be complicated.

The present invention is achieved in view of the above and an object thereof is to provide the steering device capable of inhibiting the generation of the abnormal sound without the complicated structure.

Solution to Problem

In order to solve the above mentioned problem and achieve the object, a steering device according to the present invention includes a first gear configured to be connected to an output shaft which transmits an output to a turning wheel; and a second gear configured to engage with the first gear and capable of transmitting power generated by a motor to the first gear, wherein a rotational speed of the motor is made lower than the rotational speed during normal operation, at the time driving of the motor which stops is started or at the time a rotational direction of the second gear is reversed.

Further, in the steering device, it is preferable that at the time the rotational speed of the motor is lowered, a limit value of at least any one of an applied voltage and a target current to the motor, and a target angle and a target angular speed at the time of rotation of the motor is changed to lower the speed.

Further, in the steering device, it is preferable that the rotational speed of the motor is set to the speed during the normal operation in at least one of following cases: an elapsed time from previous reverse of the rotational direction of the second gear is not longer than a predetermined time, a vehicle speed is not lower than a predetermined value, and a target speed is not higher than a predetermined value.

Further, in the steering device, it is preferable to further include a variable operating device configured to perform operation based on the steering operation and an amount of the operation changes by a control gain, wherein at the time the rotational speed of the motor is lowered, the limit value of at least any one of the rotational speed, the applied voltage, the target current, and the target angular speed of the motor is preferably changed as the control gain changes.

Further, in the steering device, it is preferable that the control gain is a control gain of a VGRS or an ARS, or an angular feedback gain of the VGRS or the ARS, or a current feedback gain of the VGRS or the ARS.

Further, in the steering device, it is preferable that at the time the rotational speed of the motor is lowered, a control value of at least any one of the rotational speed, the applied voltage, the target current, and the target angular speed of the motor is changed as a response speed of the VRGS or the ARS is higher or as the vehicle speed is lower.

Further, in the steering device, it is preferable that at the time the rotational speed of the motor is lowered, limitation of at least one of the rotational speed, the applied voltage, the target current, the target angle, and the target angular speed of the motor is canceled by a positional relationship between the first gear and the second gear or by an elapse of a predetermined time.

Advantageous Effects of Invention

The steering device according to the present invention has an effect of inhibiting the generation of the abnormal sound without the complicated structure.

DESCRIPTION OF EMBODIMENTS

Embodiments of a steering device according to the present invention are hereinafter described in detail with reference to the drawings. Meanwhile, the present invention is not limited by the embodiments. Components in the following embodiments include a component easily replaceable by one skilled in the art or a substantially identical component.

First Embodiment

Figure 1:
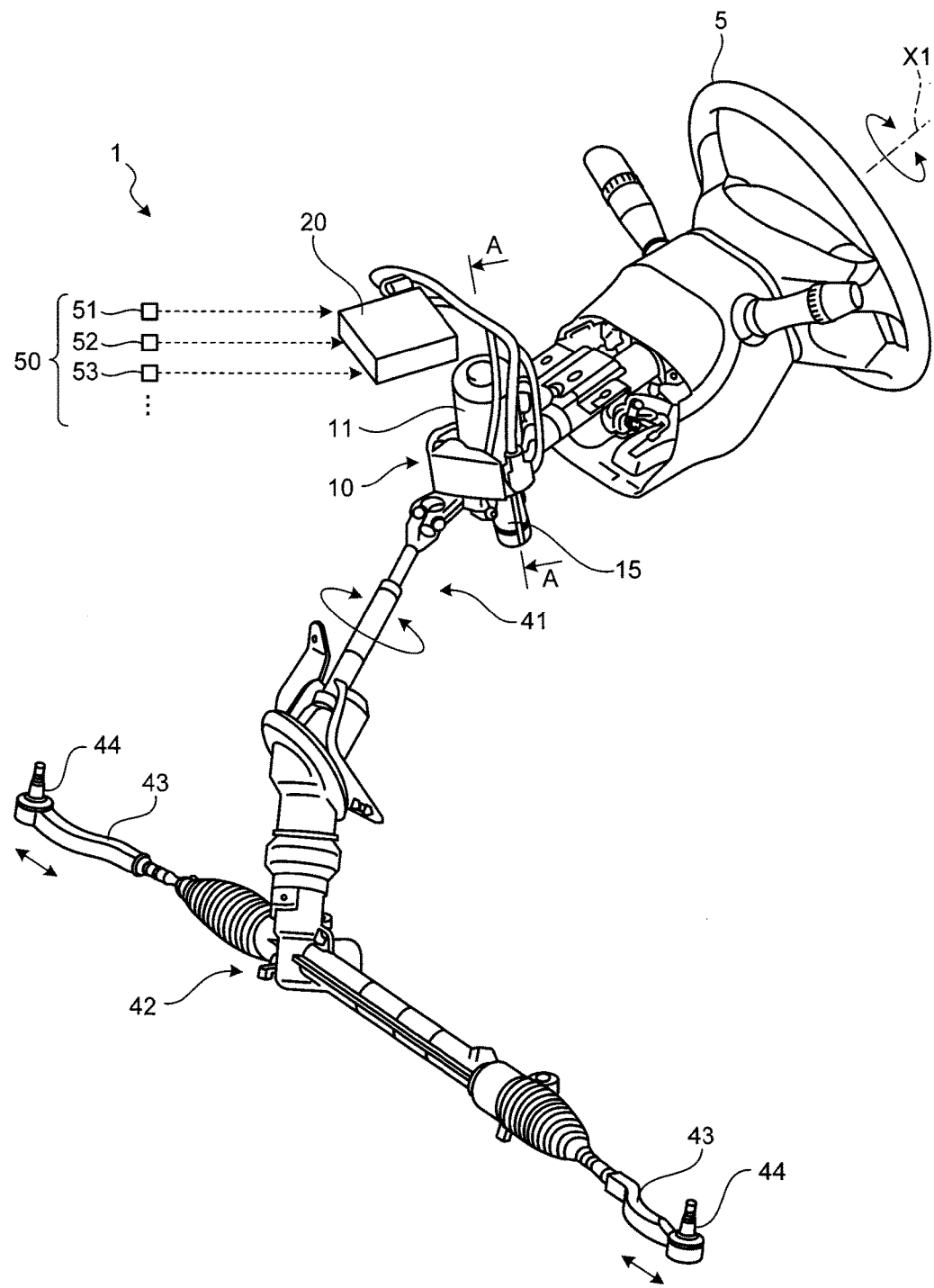
FIG. 1 is a schematic diagram of a steering device according to a first embodiment of the present invention.

FIG. 1 is a schematic diagram of a steering device according to a first embodiment of the present invention. A steering device 1 illustrated in this drawing is a so-called electric power steering (EPS: electronic power steering) device which is mounted on a vehicle as a device for steering a steered wheel of the vehicle to assist steering force at the time of steering by power of an electric motor and the like. That is, the steering device 1 is capable of assisting steering operation of a driver by driving the electric motor and the like so as to obtain steering assist force according to the steering force applied to a steering wheel (hereinafter, referred to as a "steering") 5 provided as a steering member with which the driver of the vehicle performs the steering operation.

Specifically, the steering device 1 is provided with the steering 5 and an EPS device 10 which assists the steering force input by the steering operation to the steering 5. The steering device 1 is further provided with a steering shaft (hereinafter, referred to as a "shaft") 41 which transmits the steering force by the driver to a side of the steered wheel together with assist force by the EPS device 10 and a rack-and-pinion gear mechanism (hereinafter, referred to as a "gear mechanism") 42 which converts rotational torque transmitted by the shaft 41 to force in a linear direction. The steering device 1 is further provided with a tie rod 43 which transmits the force in the linear direction converted by the gear mechanism 42 in a direction of right and left steered wheels and a tie rod end 44 which connects a knuckle arm (not illustrated) supporting the steered wheel and changing a direction of the steered wheel to the tie rod 43.

Out of them, the steering 5 is arranged on a driver's seat of the vehicle such that rotational operation is performed in a direction around a rotational axis X1. The driver can perform the steering operation by performing the rotational operation of the steering 5 around the rotational axis X1. The shaft 41 with one end coupled with the steering 5 and the other end coupled with the gear mechanism 42 is rotatable in a direction around a central axis thereof in association with the rotational operation of the steering 5 by the driver. The shaft 41 is arranged between the steering 5 and the gear mechanism 42 such that a plurality of members such as an upper shaft, an intermediate shaft, and a lower shaft is coupled with one another, for example.

The gear mechanism 42 can convert a direction of the rotational torque transmitted from the shaft 41 to the force in the linear direction in a vehicle width direction and transmit the same to the tie rod 43, and the tie rod 43 is coupled with the knuckle arm so as to be able to rotate the knuckle arm by the force. According to this, it becomes possible to change the direction of the steered wheel by the steering operation to the steering 5.

The EPS device 10 is a device which outputs the steering assist force to assist the steering force input by the driver to the steering 5. That is, the EPS device 10 increases the rotational torque transmitted from the shaft 41 to the gear mechanism 42 to assist the steering operation of the driver by allowing assist torque being the steering assist force to act on the shaft 41. That is, the EPS device 10 can reduce the steering force input by the driver to the steering 5 by generating a part of the force acting on the knuckle arm by the steering operation at the time of the steering.

The EPS device 10 includes a motor 11 being the electric motor and a decelerator 15. The steering device 1 according to the first embodiment is a so-called column EPS device in which the power generated by the motor 11 is input to the shaft 41 such as the intermediate shaft and is provided with a column assist-type assist mechanism.

Figure 2:
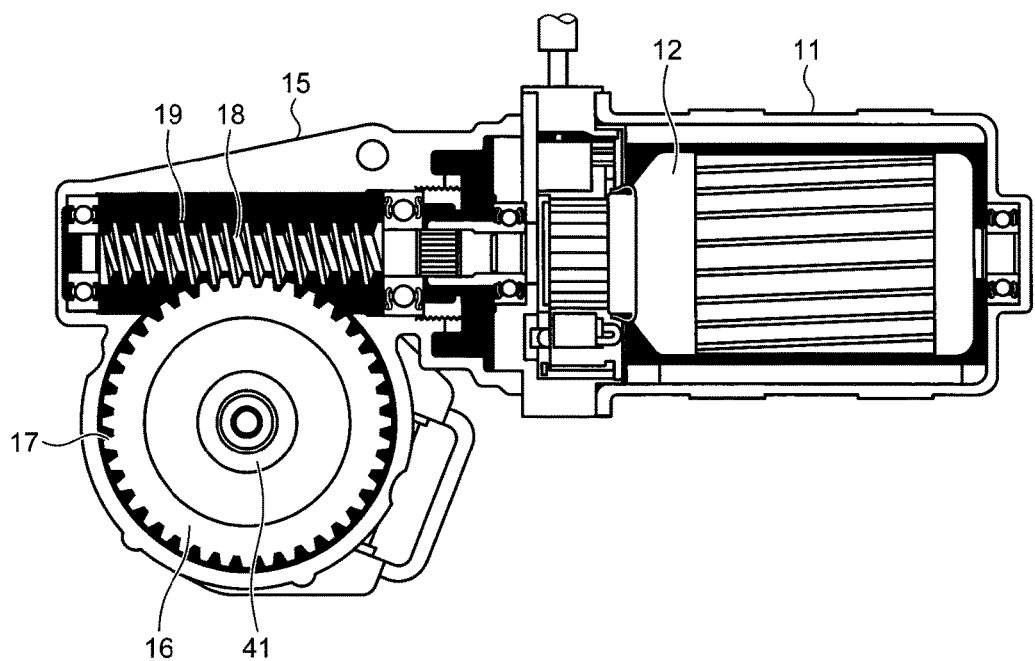
FIG. 2 is a cross-sectional diagram taken in an A-A direction of FIG. 1.

FIG. 2 is a cross-sectional diagram taken in an A-A direction of FIG. 1. The motor 11 is provided as an electric motor for column assist which generates the power by supply of electric power from a battery (not illustrated) mounted on the vehicle, and the EPS device 10 can generate the assist torque being the steering assist force by the power generated by the motor 11. The motor 11 provided in this manner is connected to the shaft 41 through the decelerator 15 and the like to be installed such that the power can be transmitted to the shaft 41 through the decelerator 15 and the like.

The decelerator 15 includes a wheel gear 16 being a first gear connected to an output shaft such as the shaft 41 which transmits an output to a turning wheel to operate based on the steering operation to the steering 5 and a worm gear 18 being a second gear engaging with the wheel gear 16 and capable of transmitting the power generated by the motor 11 to the wheel gear 16.

Out of them, the worm gear 18 is coupled with the motor 11 so as to be integrally rotatable with a rotor 12 being a rotational body of the motor 11. The wheel gear 16 formed of a helical gear is connected to the shaft 41 so as to be integrally rotatable with the shaft 41. The wheel gear 16 and the worm gear 18 are arranged in an engaging state, and according to this, the power of the motor 11 generated when the motor 11 is driven is transmitted from the worm gear 18 to the wheel gear 16 and can be transmitted from the wheel gear 16 to the shaft 41. At that time, the decelerator 15 decelerates rotational power generated by the motor 11 and increases the torque to transmit to the shaft 41.

In this manner, an EPS control device 20 can control the EPS device 10 capable of transmitting the rotational power to the shaft 41; specifically, this controls the motor 11 to control the rotational torque transmitted from the EPS device 10 to the shaft 41.

A state detecting device 50 which detects a state of the vehicle on which the steering device 1 is mounted is electrically connected to the EPS control device 20 which controls the EPS device 10. The state detecting device 50 is mainly formed of sensors installed on each part of the vehicle and this includes, for example, a torque sensor 51 which detects torque acting on the steering 5, a rudder angle sensor 52 which detects a rudder angle being a rotational angle when the steering operation of the steering 5 is performed, and a vehicle speed sensor 53 which detects a vehicle speed of the vehicle on which the steering device 1 is mounted.

Out of them, the torque sensor 51 can detect torque acting on a torsion bar (not illustrated) by detecting torsion of the torsion bar being a torsion member forming a part of the EPS device 10 provided within the shaft 41. That is, one end of the torsion bar inputs/outputs the torque to/from a side of the steering 5 of the shaft 41 and the other end of the torsion bar inputs/outputs the torque to/from a side of the gear mechanism 42 of the shaft 41.

According to this, the torsion is generated in the torsion bar according to difference between the torque input/output to/from the side of the steering 5 and the torque input/output to/from the side of the gear mechanism 42, and the torque sensor 51 detects the torque acting on the steering 5 by detecting the torsion. Therefore, the torque sensor 51 detects the torque which reflects steering torque acting on the shaft 41 according to the steering force input to the steering 5 and disturbance torque input from the side of the steered wheel to the shaft 41 through the tie rod 43 and the gear mechanism 42 according to a road surface disturbance input and the like to the steered wheel.

The rudder angle sensor 52 can detect an absolute rotational angle of the shaft 41 which integrally rotates with the steering 5, that is, the rotational angle with respect to an angular position of the shaft 41 when the vehicle runs in a straight line as the rudder angle. For example, the rudder angle sensor 52 detects the rotational angle of the shaft 41 by detecting a rotational angle of the rotor 12 of the motor 11 embedded in the motor 11 to rotate through the decelerator 15 in association with the rotation of the shaft 41. The rotational angle of the shaft 41 may also be detected by a rotational angle sensor attached to the motor 11.

The vehicle speed sensor 53 provided so as to be able to detect a rotational speed of an output shaft of a transmission device (not illustrated) of the vehicle, for example, detects the vehicle speed based on the rotational speed of the output shaft. Detection results of the vehicle state detected by the state detecting device 50 such as the torque sensor 51, the rudder angle sensor 52, and the vehicle speed sensor 53 are transmitted to the EPS control device 20 by electric signals, and the EPS control device 20 controls the EPS device 10 based on the detection results of the vehicle state.

Figure 3:
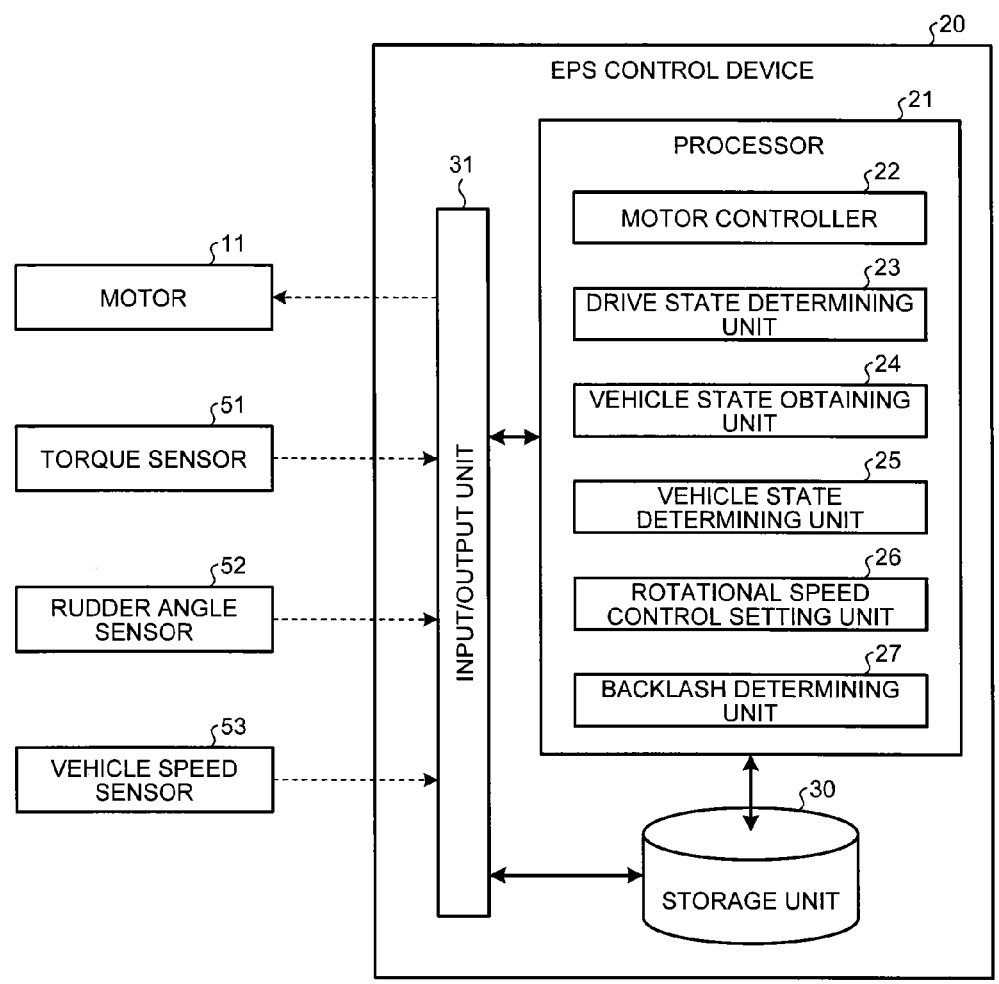
FIG. 3 is a configuration diagram of a substantial part of the steering device illustrated in FIG. 1.

FIG. 3 is a configuration diagram of a substantial part of the steering device illustrated in FIG. 1. The EPS control device 20 is provided with a processor 21 including a CPU (central processing unit) and the like, a storage unit 30 such as a RAM (random access memory), and an input/output unit 31 which are connected to one another so as to be able to communicate signals with one another. The motor 11 and the state detecting device 50 connected to the EPS control device 20 are connected to the input/output unit 31, and the input/output unit 31 inputs/outputs the signals to/from the state detecting device 50 and the like. A computer program which controls the EPS device 10 is stored in the storage unit 30.

The processor 21 of the EPS control device 20 provided in this manner includes a motor controller 22 which performs drive control of the motor 11, a drive state determining unit 23 which determines a drive state of the motor 11, a vehicle state obtaining unit 24 which obtains the vehicle state, a vehicle state determining unit 25 which determines the vehicle state, a rotational speed control setting unit 26 which sets a set value when a rotational speed of the motor 11 is controlled, and a backlash determining unit 27 which determines a state of backlash of the decelerator 15.

When the EPS control device 20 controls the EPS device 10, based on the detection results of the state detecting device 50 and the like, the processor 21 reads the computer program in a memory embedded in the processor 21 to perform arithmetic operation and controls the motor 11 according to a result of the arithmetic operation to generate the assist torque suitable for the vehicle state. At that time, the processor 21 appropriately stores a numeric value the arithmetic operation of which is halfway done in the storage unit 30 and takes the stored numerical value therefrom to execute the arithmetic operation.

The steering device 1 according to the first embodiment is configured as described above; an effect thereof is hereinafter described. When the driver performs the steering operation of the steering 5 when the vehicle runs, the rotational torque input to the steering 5 is transmitted to the gear mechanism 42 through the shaft 41, and the gear mechanism 42 transmits the same to the tie rod 43 after converting a direction of force by the rotational torque to the direction in the width direction of the vehicle. At that time, the gear mechanism 42 transmits the force in a direction according to the direction of the rotational torque input to the steering 5 out of the width direction of the vehicle, that is, a right and left direction of the vehicle, to the tie rod 43. The tie rod 43 to which the force in the width direction of the vehicle is input moves in the direction of the input force and the knuckle arm rotates in association with the movement of the tie rod 43. According to this, the direction of the steered wheel changes by the direction and angle of the rotational torque input to the steering 5, and a direction of the running vehicle changes according to the steering operation to the steering 5.

When the steering operation is performed to the steering 5 in this manner, the EPS device 10 operates according to the vehicle state, thereby generating the assist torque to the steering force of the driver. Specifically, when the steering operation is performed to the steering 5, the torque sensor 51 detects the rotational torque acting on the shaft 41 and the rudder angle sensor 52 detects the rudder angle being the rotational angle at the time of the steering. The rotational torque and the rudder angle are transmitted from the torque sensor 51 and the rudder angle sensor 52 to the vehicle state obtaining unit 24 included in the processor 21 of the EPS control device 20 to be obtained by the vehicle state obtaining unit 24. The vehicle speed detected by the vehicle speed sensor 53 also is transmitted to the vehicle state obtaining unit 24.

The EPS control device 20 which obtains information of the vehicle state transmitted thereto controls the EPS device 10 based on the vehicle state to drive the motor 11 and allows the EPS device 10 to generate the assist torque at the time of the steering operation of the steering 5. Specifically, the EPS control device 20 adjusts the power generated when the motor 11 is driven by adjusting an assist current supplied to the motor 11 based on the torque detected by the torque sensor 51 and the like by the motor controller 22 included in the processor 21 of the EPS control device 20. The power generated by the motor 11 is transmitted to the shaft 41 integrally rotatable with the wheel gear 16 by the rotation of the worm gear 18 in association with the rotation of the rotor 12 and the rotation of the wheel gear 16 engaging with the worm gear 18 in association of the rotation of the worm gear 18. According to this, the power generated by the motor 11 is transmitted to the shaft 41, that is, the assist torque is transmitted.

The assist torque is the rotational torque in the same direction as the rotational torque input by the driver to the steering 5 at the time of the steering operation, so that the shaft 41 rotates with the rotational torque obtained by adding the rotational torque by the power generated by the motor 11 to the rotational torque by the steering operation.

On the other hand, the rotational torque which may overcome rotational resistance of the shaft 41 caused by resistance and the like generated between the steered wheel and a road surface when the direction of the steered wheels is changed is required as the rotational torque required at the time of the steering operation. Since the EPS device 10 applies the rotational torque in the same direction as the rotational torque by the steering operation of the driver to the shaft 41, the rotational torque input can be reduced by the driver by an amount of the rotational torque generated by the EPS device 10 when the rotational torque which may overcome the rotational resistance caused by the resistance and the like with the road surface is input to the shaft 41. That is, the force input by the driver to the steering 5 at the time of the steering operation can be reduced and the steering operation of the driver can be assisted.

The resistance generated between the steered wheel and the road surface when the direction of the steered wheel is changed varies according to the vehicle speed; the lower the vehicle speed, the larger the resistance. Therefore, the EPS device 10 increases the assist torque transmitted to the shaft 41 as the vehicle speed becomes lower. Specifically, the motor controller 22 of the EPS control device 20 adjusts the assist current supplied to the motor 11 based on the information of the vehicle speed obtained by the vehicle state obtaining unit 24 and increases the power generated by the motor 11 as the vehicle speed becomes lower. According to this, the assist torque by the EPS device 10 increases as the vehicle speed becomes lower, so that it becomes possible to reduce the rotational torque input by the driver also when the rotational resistance at the time of the steering operation becomes large due to the low vehicle speed.

The EPS control device 20 adjusts the assist torque generated by the EPS device 10 by controlling the motor 11 according to the vehicle state such as the vehicle speed in this manner; this also lowers the rotational speed of the motor 11 when the assist torque is generated or when the direction of the assist torque changes. For example, when the driver performs the steering operation and the driving of the motor 11 is started from a state in which the driver does not perform the steering operation and the motor 11 of the EPS device 10 stops because the vehicle runs in the straight line, the rotational speed of the motor 11 is temporarily lowered.

That is, when the driving of the motor 11 is started and the worm gear 18 starts rotating in a state in which the motor 11 and the shaft 41 stop and the worm gear 18 and the wheel gear 16 stop, the motor 11 is driven at the rotational speed temporarily lower than the rotational speed of the motor 11 when the motor 11 is driven to generate the assist torque at the time of normal steering operation.

Meanwhile, the rotational speed of the motor 11 in this case is an unloaded rotational speed in a state in which the motor 11 is coupled with nothing, or a target rotational speed when the motor 11 is controlled. That is, since the motor 11 is coupled with the shaft 41 by the decelerator 15, when the shaft 41 rotates, the motor 11 rotates together with the shaft 41 regardless of the drive state of the motor 11; however, the target rotational speed is made lower than the target rotational speed when the motor 11 is normally driven in a current vehicle state when the driving of the motor 11 which does not generate drive force is started.

The time of normal operation in the description of the first embodiment is not when the driving of the motor 11 is stared or when a rotational direction of the second gear such as the worm gear 18 is reversed but when the motor 11 is continuously driven. For example, this is when a motor angular speed is not lower than a predetermined value for a predetermined time.

In this manner, when the rotational speed is temporarily made lower than that in normal time when the driving of the motor 11 is started, a limit value of an applied voltage of the assist current supplied to the motor 11 is made smaller. That is, the assist current supplied to the motor 11 when the motor 11 is driven is supplied with the limit value of the applied voltage. When the rotational speed is temporarily lowered, the limit value is made smaller and the electric power supplied to the motor 11 is made smaller, then the rotational speed is lowered.

As the limit value of the applied voltage, the limit value for the time of normal driving and the limit value when the rotational speed of the motor 11 is lowered are stored in advance in the storage unit 30 included in the EPS control device 20. The EPS control device 20 selects the limit value stored in the storage unit 30 by the rotational speed control setting unit 26 included in the processor 21 according to whether it is the time of the driving of the stopped motor 11 or the normal time of the generation of the assist torque and limits the applied voltage by the limit value. According to this, the applied voltage of the assist current is limited by the limit value according to the vehicle state, and when the driving of the stopped motor 11 is started, the electric power supplied to the motor 11 is limited as compared to that at the time of normal control and the rotational speed becomes lower.

Herein, a case in which the power generated by the motor 11 is transmitted between the worm gear 18 and the wheel gear 16 is described; first, in the worm gear 18, a tooth 19 engaging with the tooth 19 of the worm gear 18 is formed into a helical shape around a rotational axis of the motor 11. Therefore, when the motor 11 is driven, a part abutting the wheel gear 16 of the tooth 19 of the worm gear 18 moves in a direction of the rotational axis of the motor 11. In other words, the tooth 19 of the worm gear 18 is formed into a helically sequential shape, so that the part abutting a predetermined tooth 17 of the wheel gear 16 of the tooth 19 is displaced in an axial direction of the worm gear 18 while being displaced in a circumferential direction thereof.

On the other hand, the wheel gear 16 engages with the worm gear 18 such that a rotational axis thereof is orthogonal to a rotational axis of the worm gear 18, so that a circumferential direction in the vicinity of a part engaging with the worm gear 18 of the wheel gear 16 is in a direction along the rotational axis of the worm gear 18. Therefore, when the worm gear 18 rotates in a state in which the tooth 17 of the wheel gear 16 abuts the tooth 19 of the worm gear 18, the tooth 17 of the wheel gear 16 moves in the circumferential direction of the wheel gear 16 in association with the displacement in the axial direction of the abutting part of the tooth 19 of the worm gear 18. That is, the wheel gear 16 rotates about the rotational axis of the wheel gear 16 by the force transmitted from the worm gear 18 to transmit the rotational torque to the shaft 41.

Therefore, when the assist torque is generated by the EPS device 10, the EPS control device 20 controls the motor 11 so that the motor 11 is driven at the rotational speed based on the vehicle state detected by the state detecting device 50, and the worm gear 18 and the wheel gear 16 engage with each other with the backlash. Therefore, a gap is formed between the tooth 19 of the worm gear 18 and the tooth 17 of the wheel gear 16 when the motor 11 stops.

In this manner, when the driving of the motor 11 is started from the state in which the motor 11 stops, the abutting part of the tooth 19 of the worm gear 18 being displaced in the axial direction on the tooth 17 of the wheel gear 16 abuts the tooth 17 of the wheel gear 16, then the transmission of the rotational torque from a side of the worm gear 18 to a side of the wheel gear 16 is started.

At that time, a relative speed when the tooth 19 of the worm gear 18 abuts the tooth 17 of the wheel gear 16 is lowered by temporarily making the rotational speed of the motor 11 lower than that in the normal time. According to this, an impact when separated both teeth start making contact with each other becomes small and abnormal sound generated by the impact becomes small.

The rotational speed of the motor 11 which is temporarily lowered when the driving of the motor 11 is started is set to the rotational speed in the normal time when the tooth 19 of the worm gear 18 abuts the tooth 17 of the wheel gear 16 after the driving of the motor 11 is started. That is, after an elapse of a predetermined time in which it may be determined that the tooth 19 of the worm gear 18 abuts the tooth 17 of the wheel gear 16 after the driving of the motor 11 is started, the rotational speed control setting unit 26 included in the processor 21 of the EPS control device 20 selects the limit value in the normal time. According to this, the limit value of the applied voltage when the motor controller 22 controls the motor 11 is set to the limit value at the time of the normal control and the rotational speed of the motor 11 is set to the normal rotational speed when the assist torque is generated. That is, limitation of the applied voltage to the motor 11 is canceled by a positional relationship between the wheel gear 16 and the worm gear 18, the limit value of the applied voltage is set to the normal limit value when the assist torque is generated, and limitation of the rotational speed is canceled.

Meanwhile, the time in which it can be determined that the tooth 19 of the worm gear 18 abuts the tooth 17 of the wheel gear 16 in this case is stored in advance in the storage unit 30 included in the EPS control device 20. The EPS control device 20 determines whether the time stored in the storage unit 30 elapses after the driving is started in a state in which the rotational speed of the motor 11 is lowered by the backlash determining unit 27 included in the processor 21. When the backlash determining unit 27 determines that the time elapses and it reaches a state in which it can be determined that the worm gear 18 rotates by an amount of the backlash, the rotational speed of the motor 11 is set to the normal rotational speed when the assist torque is generated.

The control to lower the rotational speed when the driving of the motor 11 is started from the state in which the motor 11 stops in this manner is also performed when a steering direction is changed. That is, when the direction of the steering operation of the driver is changed and the direction of the rotational torque input to the shaft 41 through the steering 5 is reversed according to this, a rotational direction of the motor 11 is also reversed. In this manner, also when the rotational direction of the motor 11 is reversed, the motor 11 temporarily stops when the rotational direction is reversed, so that, when the rotation is started thereafter with the direction changed from a previous rotational direction, the rotational speed of the motor 11 is temporarily lowered.

When the rotational direction of the motor 11 is reversed, a rotational direction of the worm gear 18 is also reversed; when the worm gear 18 is reversed, a surface of the tooth 19 of the worm gear 18 opposite to a surface abutting the tooth 17 of the wheel gear 16 before the reverse abuts the tooth 17 of the wheel gear 16. Therefore, the direction in which the part abutting a predetermined tooth 17 of the wheel gear 16 of the tooth 19 of the worm gear 18 is displaced in the axial direction is the direction opposite to the direction of the displacement before the motor 11 is reversed. Therefore, when the motor 11 is reversed, the surface of the tooth 19 of the worm gear 18 opposite to the surface abutting the tooth 17 of the wheel gear 16 before the reverse abuts the tooth 17 of the wheel gear 16, and according to this, the transmission of the rotational torque from the side of the worm gear 18 to the side of the wheel gear 16 is started.

In this case, parts which do not abut before the reverse due to the backlash of the tooth 19 of the worm gear 18 and the tooth 17 of the wheel gear 16 abut; at that time, the rotational speed of the motor 11 is temporarily made lower than that in the normal time to lower the relative speed when the tooth 19 of the worm gear 18 abuts the tooth 17 of the wheel gear 16. According to this, the impact when both teeth start making contact with each other is made small and the abnormal sound generated by the impact is made small.

Figure 4:
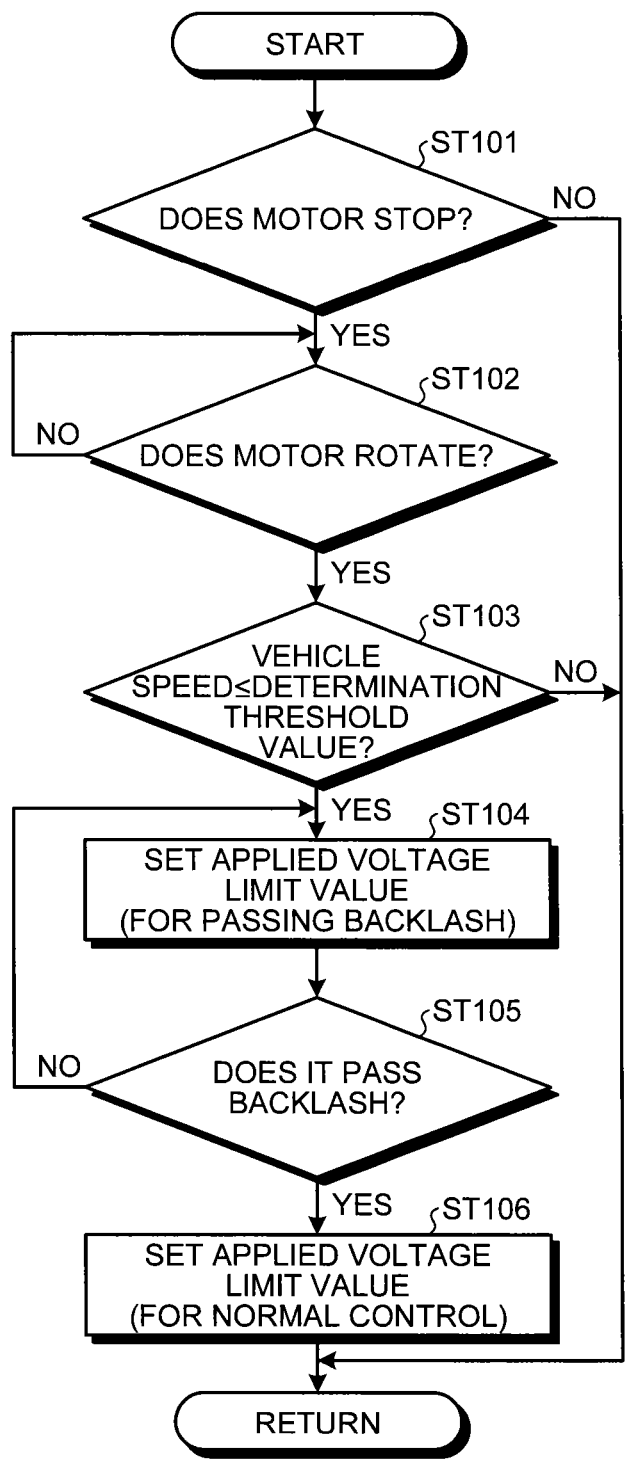
FIG. 4 is a flow diagram of a schematic procedure of the steering device according to the first embodiment.

FIG. 4 is a flow diagram of a schematic procedure of the steering device according to the first embodiment. Next, the procedure in a case in which the assist torque is generated from the state in which the motor 11 stops in the steering device 1 according to this embodiment is schematically described. In this procedure, it is first determined whether the motor 11 stops (step ST101). The drive state determining unit 23 of the EPS control device 20 determines this. That is, the control to lower the rotational speed when the driving of the motor 11 is started is performed when the driving of the motor 11 is started also in the stopping state. Therefore, the drive state determining unit 23 determines whether the motor 11 stops based on the detection result of the rudder angle by the rudder angle sensor 52 obtained by the vehicle state obtaining unit 24 as a precondition of the control to lower the rotational speed when the driving of the motor 11 is started. When the drive state determining unit 23 determines that the motor 11 does not stop (step ST101, No), it exits from the procedure.

On the other hand, when the drive state determining unit 23 determines that the motor 11 stops (step ST101, Yes determination), it is next determined whether the motor 11 rotates (step ST102). That is, the drive state determining unit 23 determines whether the driving is started from the state in which the motor 11 stops based on the detection result of the rudder angle sensor 52. When it is determined that the motor 11 does not rotate by the determination (step ST102, No determination), it is continuously determined whether the motor 11 rotates (step ST102). In other words, the drive state determining unit 23 determines whether the worm gear 18 stops or rotates based on the detection result by the rudder angle sensor 52 or the detection result by the rotational angle sensor attached to the motor 11 and to determine whether the worm gear 18 rotates after this stops.

On the other hand, when the drive state determining unit 23 determines that the motor 11 rotates (step ST102, Yes determination), it is next determined whether "vehicle speed≤determination threshold value" is satisfied (step ST103). The vehicle state determining unit 25 included in the processor 21 of the EPS control device 20 determines whether the detection result of the vehicle speed detected by the vehicle speed sensor 53 obtained by the vehicle state obtaining unit 24 is not higher than the determination threshold value when it is determined whether to control to lower the rotational speed when the driving of the motor 11 is started based on the vehicle speed.

That is, when the vehicle speed is high, it is preferable to give priority to responsiveness to the steering operation to rapidly generate the assist torque. The determination threshold value used in the determination by the vehicle state determining unit 25 is set in advance as a threshold value of the vehicle speed used when it is determined whether a current vehicle speed is the vehicle speed to give priority to the responsiveness to the steering operation and is stored in the storage unit 30 of the EPS control device 20.

The vehicle state determining unit 25 compares the determination threshold value stored in the storage unit 30 and the vehicle speed obtained by the vehicle state obtaining unit 24 to determine whether "vehicle speed≤determination threshold value" is satisfied. When it is determined that the vehicle speed is higher than the determination threshold value (step ST103: No determination), that is, when it is determined that "vehicle speed>determination threshold value" is satisfied by this determination, it exits from the procedure. That is, when the vehicle speed is not lower than a predetermined value, it exits from the procedure and the rotational speed of the motor 11 is set to the speed at the time of the normal operation to control.

On the other hand, when the vehicle state determining unit 25 determines that "vehicle speed≤determination threshold value" is satisfied (step ST103, Yes determination), an applied voltage limit value is next set (step ST104). In this case, the applied voltage limit value being the limit value of the voltage supplied to the motor 11 is set to the limit value when the rotational speed of the motor 11 is lowered when the driving of the motor 11 is started. The rotational speed control setting unit 26 included in the processor 21 of the EPS control device 20 sets this.

The rotational speed control setting unit 26 sets the applied voltage limit value used when the motor controller 22 controls the motor 11 to the limit value set in advance as the limit value when the rotational speed of the motor 11 is lowered to be stored in the storage unit 30. That is, the limit value used in this case is the limit value used when passing the backlash between the gears of the decelerator 15 when the driving of the motor 11 is started, and the rotational speed control setting unit 26 sets the applied voltage limit value to the limit value for passing the backlash.

Next, it is determined whether it passes the backlash (step ST105). In this determination, the motor 11 is driven in a state in which the applied voltage limit value is set to the limit value for passing the backlash, and the backlash determining unit 27 determines whether a time for passing the backlash of the decelerator 15 elapses. That is, the time used for this determination is stored in the storage unit 30 in advance as the time in which it is possible to determine that the tooth 19 of the worm gear 18 abuts the tooth 17 of the wheel gear 16 after the driving of the motor 11 is started to pass the backlash. The backlash determining unit 27 sets the applied voltage limit value to the limit value for passing the backlash and determines whether the time after the driving of the stopped motor 11 is started elapses the time stored in the storage unit 30, thereby determining whether it passes the backlash.

When it is determined that it does not pass the backlash by this determination (step ST105, No determination), that is, when it is determined that the time after the driving of the stopped motor 11 is started is shorter than the time stored in the storage unit 30, the applied voltage limit value is continuously set to the limit value for passing the backlash (step ST104).

On the other hand, when it is determined that it passes the backlash (step ST105, Yes determination), that is, when it is determined that the time after the driving of the stopped motor 11 is started becomes longer than the time stored in the storage unit 30, the applied voltage limit value is next set (step ST106). In this case, the rotational speed control setting unit 26 sets the applied voltage limit value to the limit value of the voltage supplied to the motor 11 at the time of the normal control when the assist torque is generated by the EPS device 10.

The rotational speed control setting unit 26 sets the applied voltage limit value used when the motor 11 is controlled to the limit value set in advance as the limit value at the time of the normal control when the assist torque is generated to be stored in the storage unit 30. That is, the rotational speed control setting unit 26 sets the applied voltage limit value to the limit value for the normal control. According to this, the EPS control device 20 performs the normal control when generating the assist torque to the EPS device 10.

The above-described steering device 1 makes the rotational speed of the motor 11 lower than that at the time of the normal operation when the driving of the stopped motor 11 is started or when the rotational direction of the worm gear 18 is reversed in association with the reverse of the motor 11, so that this may lower the relative speed when the tooth 19 of the worm gear 18 and the tooth 17 of the wheel gear 16 separated by the backlash abut. According to this, the impact at the time of the contact of the separated both teeth becomes small and the abnormal sound generated by the impact becomes small. As a result, it is possible to inhibit the generation of the abnormal sound without a complicated structure.

When the rotational speed of the motor 11 is lowered, it is lowered by the change in the limit value of the applied voltage to the motor 11, so that the impact at the time of the contact of the tooth 19 of the worm gear 18 and the tooth 17 of the wheel gear 16 separated by the backlash may be more surely made small. As a result, it is possible to more surely inhibit the generation of the abnormal sound without the complicated structure.

When the rotational speed of the motor 11 is lowered, the limitation of the applied voltage to the motor 11 is canceled by the positional relationship between the wheel gear 16 and the worm gear 18, so that it is possible to inhibit the generation of the abnormal sound while securing the generation of the assist torque. That is, it is set to the limit value of the normal applied voltage when the assist torque is generated after the tooth 19 of the worm gear 18 and the tooth 17 of the wheel gear 16 are brought into contact with each other and the abnormal sound is not generated anymore, so that the generation of the assist torque may be secured after the generation of the abnormal sound is inhibited. As a result, it is possible to satisfy both of the generation of the assist torque and the inhibition of the abnormal sound without the complicated structure.

Second Embodiment

Although a steering device 60 according to a second embodiment has a configuration substantially similar to that of a steering device 1 according to a first embodiment, this is characterized by adjustment of a limit value according to a vehicle state when this controls to lower a rotational speed of a motor 11. The configuration is similar to that of the first embodiment other than this, so that the description thereof is omitted and the same reference sign is assigned.

Figure 5:
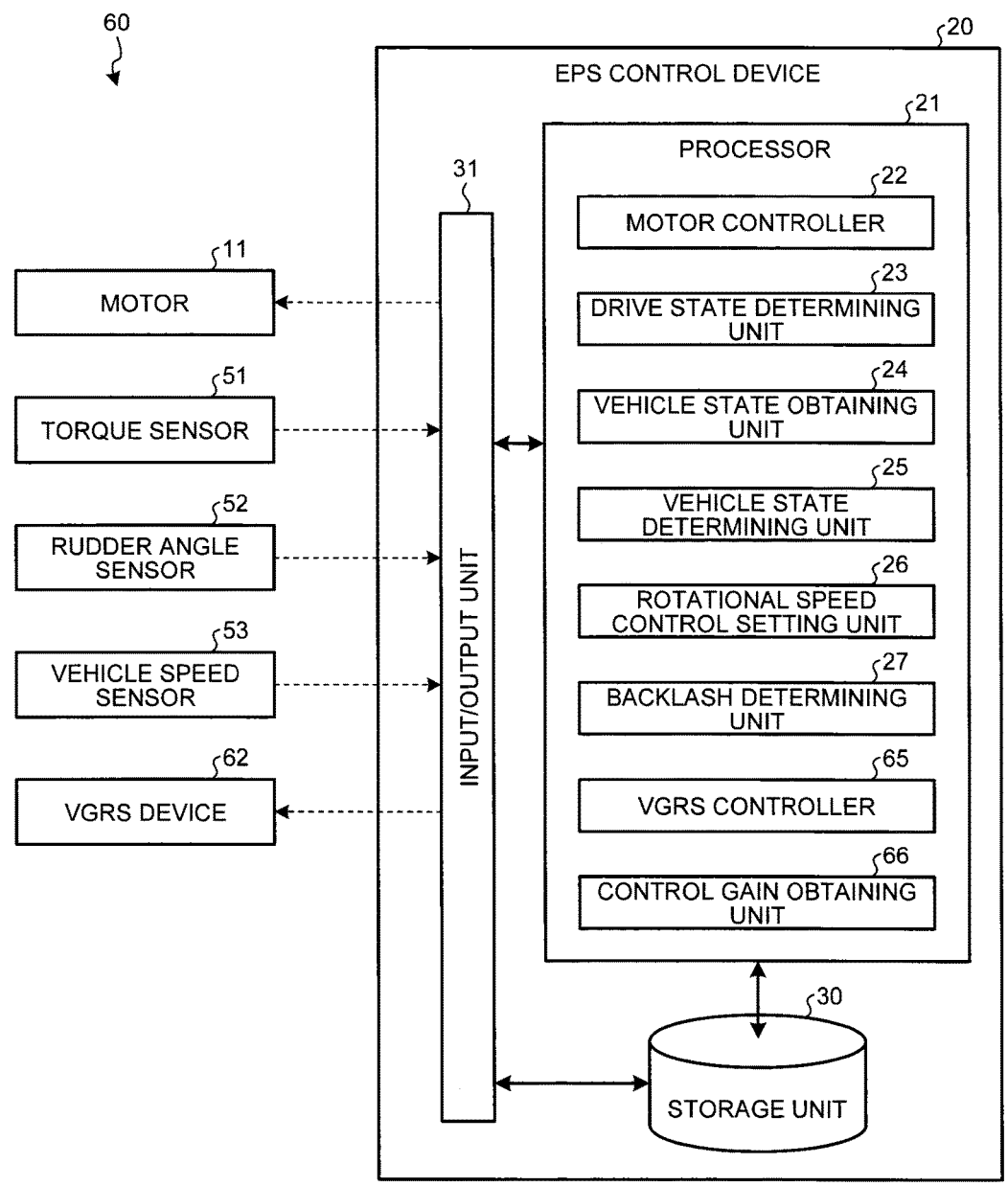
FIG. 5 is a configuration diagram of a substantial part of a steering device according to a second embodiment.

FIG. 5 is a configuration diagram of a substantial part of the steering device according to the second embodiment. The steering device 60 according to the second embodiment including an EPS device 10 as the steering device 1 according to the first embodiment may assist steering operation of a driver by adding assist torque by the EPS device 10 to rotational torque at the time of the steering operation to a steering 5. The steering device 60 according to the second embodiment is configured as a VGRS (variable gear ratio steering) being a variable gear ratio steering, that is, a rate of change in direction of a steered wheel with respect to steering of the steering 5 varies according to a running state of a vehicle.

That is, in the steering device 60 according to the second embodiment, a shaft 41 is separated between the steering 5 and a gear mechanism 42 and both shafts 41 are connected to each other through a VGRS device 62 being a variable operating device which performs operation based on the steering operation with an operation amount changing by a control gain. The VGRS device 62 may be controlled by an EPS control device 20 and is configured such that a rotational angle of a part connected to the steering 5 of the shaft 41 and a rotational angle of a part connected to the gear mechanism 42 of the shaft 41 can be changed according to a vehicle speed and a rudder angle. Therefore, it is possible to change the rate of change in the direction of the steered wheel with respect to the rudder angle of the steering 5 according to the vehicle speed and the rudder angle by changing a degree of the change in the rotational angle of the part on a side of the steering 5 and the part on a side of the gear mechanism 42 of the shaft 41 by the VGRS device 62 according to the vehicle speed and the rudder angle.

The EPS control device 20 to which the VGRS device 62 is connected includes a processor 21, a storage unit 30, and an input/output unit 31 as the EPS control device 20 of the steering device 1 according to the first embodiment in which the processor 21 includes a motor controller 22, a drive state determining unit 23, a vehicle state obtaining unit 24, a vehicle state determining unit 25, a rotational speed control setting unit 26, and a backlash determining unit 27. Further, in the EPS control device 20 of the steering device 60 according to the second embodiment, the processor 21 includes a VGRS controller 65 which controls the VGRS device 62 and a control gain obtaining unit 66 which obtains the control gain when the VGRS device 62 is controlled.

The steering device 60 according to the second embodiment is configured as described above and an effect thereof is hereinafter described. At the time of the steering operation of the steering 5 by the driver, the EPS control device 20 controls the EPS device 10 to allow the EPS device 10 to generate the assist torque and assists the steering operation. At the time of the steering operation of the steering 5, the EPS control device 20 changes the rate of change in the direction of the steered wheel with respect to the rudder angle of the steering 5 according to the vehicle speed and the rudder angle by controlling the VGRS device 62. Specifically, when controlling the VGRS device 62, the EPS control device 20 changes the control gain according to the vehicle speed, thereby changing the rate of change in the direction of the steered wheel with respect to the rudder angle of the steering 5.

That is, at the time of the steering operation of the driver, the vehicle state obtaining unit 24 of the EPS control device 20 obtains information of the vehicle speed, and as the vehicle speed becomes lower, the VGRS controller 65 controls the VGRS device 62 with a larger control gain. According to this, the VGRS device 62 outputs the rotational torque with a relatively large rotational angle with respect to the rudder angle of the steering 5 to the side of the gear mechanism 42 and the rate of change in the direction of the steered wheel with respect to the rudder angle of the steering 5 becomes large. In this manner, in a range in which the vehicle speed is relatively low, the EPS control device 20 secures controllability at a low speed by increasing the rate of change in the direction of the steered wheel with respect to the rudder angle of the steering 5 by controlling the VGRS device 62.

The VGRS controller 65 controls the VGRS device 62 by making the control gain smaller as the vehicle speed becomes higher the other way round, so that the VGRS device 62 outputs the rotational torque with a relatively small rotational angle with respect to the rudder angle of the steering 5 to the side of the gear mechanism 42. According to this, the rate of change in the direction of the steered wheel with respect to the rudder angle of the steering 5 becomes small. In this manner, in a region in which the vehicle speed is relatively high, the EPS control device 20 secures running stability at the time of high-speed running by decreasing the rate of change in the direction of the steered wheel with respect to the rudder angle of the steering 5 by controlling the VGRS device 62.

When driving of the stopped motor 11 of the EPS device 10 is started or when a worm gear 18 is reversed by reverse of a rotational direction of the motor 11, the rotational speed of the motor 11 is lowered by limitation of an applied voltage of the motor 11. In this case, the steering device 60 according to the second embodiment changes a limit value of the applied voltage according to the vehicle state. That is, when the driver performs the steering operation, the EPS control device 20 also controls the VGRS device 62; when the applied voltage of the motor 11 is limited, the limit value of the applied voltage is changed according to the control gain when the VGRS controller 65 controls the VGRS device 62.

Specifically, when the rotational speed of the motor 11 is made lower than that in normal time when the driving of the stopped motor 11 is started or when the rotational direction is reversed by the steering operation of the driver, the control gain obtaining unit 66 obtains the control gain when the VGRS controller 65 controls the VGRS device 62. The rotational speed control setting unit 26 makes the limit value of the applied voltage of the motor 11 smaller as the control gain obtained by the control gain obtaining unit 66 becomes larger, thereby tightening the limitation of the applied voltage. That is, this increases a level of reduction in the rotational speed of the motor 11 to lower the rotational speed. That is, when the control gain of the VGRS device 62 is large, the shaft 41 located on an output side of the VGRS device 62 rotates widely even when change in the rudder angle is small and an impact speed of tooth contact of a decelerator 15 becomes high. Therefore, the rotational speed control setting unit 26 makes an impact at the time of contact small by further lowering the rotational speed of the motor 11 and lowering a relative speed when the teeth of the decelerator 15 are brought into contact with each other as the control gain of the VGRS device 62 becomes larger.

Figure 6:
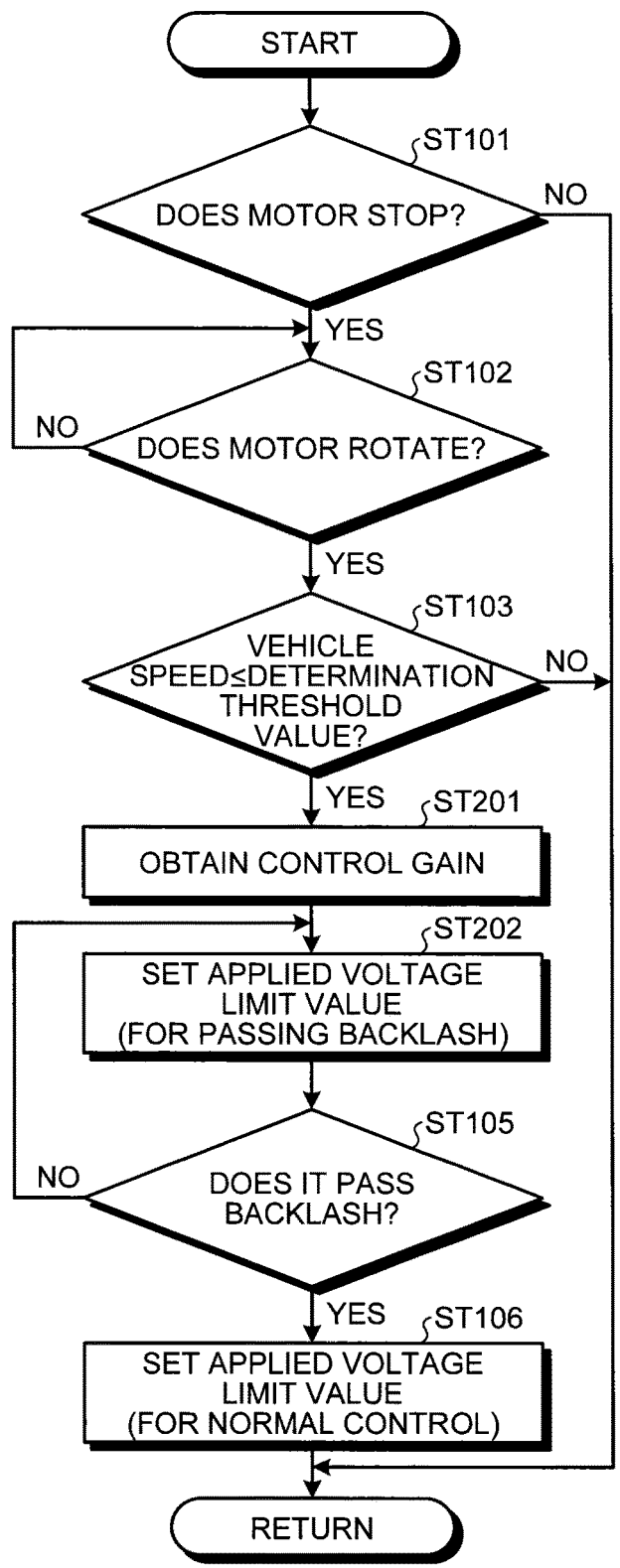
FIG. 6 is a flow diagram of a schematic procedure of the steering device according to the second embodiment.

FIG. 6 is a flow diagram of a schematic procedure of the steering device according to the second embodiment. Next, the procedure of a case in which the assist torque is generated from a state in which the motor 11 stops in the steering device 60 according to the second embodiment is schematically described. In this procedure, as in the steering device 1 according to the first embodiment, the drive state determining unit 23 first determines whether the motor 11 stops (step ST101), and when this determines that the motor 11 does not stop (step ST101, No determination), it exits from the procedure.

On the other hand, when it is determined that the motor 11 stops (step ST101, Yes determination), the drive state determining unit 23 next determines whether the motor 11 rotates (step ST102), thereby determining whether the driving is started from the state in which the motor 11 stops.

When it is determined that the motor 11 does not rotate by the determination (step ST102, No determination), it is continuously determined whether the motor 11 rotates (step ST102), and when it is determined that the motor 11 rotates (step ST102, Yes determination), the vehicle state determining unit 25 next determines whether "vehicle speed≤determination threshold value" is satisfied (step ST103). When it is determined that the vehicle speed is higher than the determination threshold value by this determination (step ST103, No determination), it exits from the procedure.

On the other hand, when it is determined that "vehicle speed≤determination threshold value" is satisfied by the determination by the vehicle state determining unit 25 (step ST103, Yes determination), the control gain is next obtained (step ST201). When the control gain is obtained, the control gain obtaining unit 66 of the EPS control device 20 obtains the control gain determined when the VGRS controller 65 of the EPS control device 20 controls the VGRS device 62 to be used in the control of the VGRS device 62.

Next, the applied voltage limit value is set (step ST202). That is, the rotational speed control setting unit 26 sets the applied voltage limit value to the motor 11 to the limit value with which the rotational speed of the motor 11 becomes lower than that at the time of normal control to generate assist torque for passing backlash.

At that time, the rotational speed control setting unit 26 makes the limit value smaller as the control gain obtained by the control gain obtaining unit 66 becomes larger, thereby tightening the limitation of the applied voltage. That is, this makes an allowable value of the applied voltage smaller. On the other hand, the rotational speed control setting unit 26 makes the limit value larger as the control gain obtained by the control gain obtaining unit 66 becomes smaller to ease the limitation of the applied voltage. That is, this makes the allowable value of the applied voltage larger within a range of the allowable value at the time of the normal control to generate assist torque, thereby decreasing a degree of lowering the rotational speed of the motor 11.

Meanwhile, a reference when the limit value of the applied voltage is set according to the control gain is stored in the storage unit 30 of the EPS control device 20 in advance in a map state, and the rotational speed control setting unit 26 sets the limit value of the applied voltage by comparing the control gain obtained by the control gain obtaining unit 66 with the map.

Next, the backlash determining unit 27 determines whether it passes the backlash based on an elapsed time after the motor 11 is driven in a state in which the applied voltage limit value is set to the limit value for passing the backlash (step ST105). When it is determined that it does not pass the backlash by the determination (step ST105, No determination), the applied voltage limit value is continuously set to the limit value based on the control gain (step ST202).

On the other hand, when it is determined that it passes the backlash (step ST105, Yes determination), the rotational speed control setting unit 26 next sets the applied voltage limit value to the motor 11 to the limit value of the voltage at the time of the normal control when the assist torque is generated by the EPS device 10 (step ST106). According to this, the EPS control device 20 performs the normal control when generating the assist torque to the EPS device 10.

The above-described steering device 60 changes the limit value of the applied voltage to the motor 11 to change the limit value as the control gain when the VGRS device 62 is controlled changes when the rotational speed of the motor 11 is lowered, so that it is possible to adjust a generation amount of the assist torque and a rate to inhibit abnormal sound according to the vehicle state. As a result, it is possible to appropriately inhibit the generation of the abnormal sound according to the vehicle state without a complicated structure.

When the rotational speed of the motor 11 is lowered, the limit value of the applied voltage to the motor 11 is made smaller as the control gain when the VGRS device 62 is controlled becomes larger and an allowable amount of the applied voltage of the motor 11 is made smaller, so that the impact speed of the tooth contact of the decelerator 15 in a state in which the rudder angle is likely to be large may be lowered. On the other hand, the limit value of the applied voltage to the motor 11 is made larger as the control gain when the VGRS device 62 is controlled becomes smaller and the allowable amount of the applied voltage of the motor 11 is made larger, so that it is possible to secure the assist torque in a state in which the rudder angle is less likely to be large. As a result, it is possible to more surely inhibit the generation of the abnormal sound while securing the generation amount of the assist torque.

[Variation]

Meanwhile, a steering device 60 according to a second embodiment is provided with a VGRS device 62 as a variable operating device with an operation amount changing by a control gain, and a limit value of an applied voltage is changed based on the control gain at the time of control of the VGRS device 62 when control to lower a rotational speed of a motor 11 is performed; however, the variable operating device may be anything other than the VGRS device 62. For example, when an ARS (active rear steering) device being an active rear wheel steering device which steers a rear wheel according to steering operation is provided on a vehicle, the ARS device may be used as the variable operating device with the operation amount changing by the control gain. That is, the ARS device also includes a decelerator and there is backlash between teeth of gears engaging with each other, so that abnormal sound by tooth collision might be generated when the ARS device operates. Therefore, when the ARS device is used as the variable operating device also, when driving of a stopped motor 11 is started or when a rotational direction is reversed, the rotational speed of the motor 11 is lowered by change in the limit value of the applied voltage based on the control gain at the time of control of the ARS device.

Herein, as the VGRS device 62, the ARS device makes a steered amount of the rear wheel with respect to a rudder angle of a steering 5 larger by increasing the control gain as a vehicle speed becomes lower. Therefore, in the ARS device also, as in the VGRS device 62, the abnormal sound by the tooth collision is likely to be generated as the control gain becomes larger. Therefore, also when the limit value of the applied voltage is changed based on the control gain at the time of the control of the ARS device, as the control gain becomes smaller, a control amount of the applied voltage of the motor 11 is made larger to decrease a level of reduction in the rotational speed of the motor 11, and as the control gain becomes larger, the control amount of the applied voltage of the motor 11 is made smaller to increase the level of the reduction in the rotational speed of the motor 11 to lower the rotational speed. According to this, the generation of the abnormal sound can be appropriately inhibited according to a vehicle state.

When the limit value of the applied voltage is changed, this may also be changed based on anything other than the control gain. For example, the limit value of the applied voltage may be changed based on a response speed of the VGRS device 62 and the ARS device and the limit value of the applied voltage may be made smaller as the response speed becomes higher. Alternatively, the limit value of the applied voltage may be changed based on a gain of angular feedback or current feedback of the VGRS device 62 and the ARS device, and the limit value of the applied voltage may be made smaller as the gain of the angular feedback and the current feedback becomes larger.

When the response speed is high or the gain of the feedback is large, a relative speed when the teeth of the decelerator are brought into contact is likely to be high and an impact speed of tooth contact is likely to be high. Therefore, in this case, the control amount of the applied voltage of the motor 11 is made smaller to increase the level of the reduction in the rotational speed of the motor 11 to lower the rotational speed of the motor 11, and according to this, the impact speed of the tooth contact is minimized as far as possible to inhibit the generation of the abnormal sound.

The limit value of the applied voltage may also be changed based on the vehicle speed; it is possible to make the limit value of the applied voltage smaller as the vehicle speed detected by a vehicle speed sensor 53 becomes lower, for example. When the vehicle speed is low, an operational amount of a driver tends to be larger as the speed is lower, so that, when the control amount of the applied voltage is made smaller as the vehicle speed becomes lower to increase the level of the reduction in the rotational speed of the motor 11, it is possible to more surely inhibit the generation of the abnormal sound.

In the steering devices 1 and 60 according to the above-described first and second embodiments, when the rotational speed of the motor 11 is made lower than that at the time of normal operation when the driving of the stopped motor 11 is started or when a rotational direction of a worm gear 18 is reversed, the rotational speed is lowered by the change in the limit value of the applied voltage to the motor 11; however, it is also possible to lower the rotational speed by another method. For example, it is possible to lower the rotational speed of the motor 11 by change in a limit value of a target current to the motor 11. Since the rotational speed of the motor 11 may be adjusted by electric power supplied to the motor 11, when the rotational speed of the motor 11 is lowered, it is possible to lower the rotational speed by not the applied voltage but the target current supplied to the motor 11 which is made lower than that in normal time of generation of assist torque.

When the rotational speed of the motor 11 is lowered, it is possible to control based on not the voltage and current but a mechanical physical amount. For example, it is possible to reduce the rotational speed by changing the limit value of a target angle or a target angular speed at the time of rotation of the motor 11.

That is, when controlling the motor 11 in order to generate the assist torque by an EPS device 10, it is possible to set the target angle being a target value of the rudder angle at the time of the rotation of the motor 11 and control such that the rudder angle detected by the rudder angle sensor 52 reaches the target angle, and when slowing down the rotation of the motor 11, it is possible to make the limit value of the target angle small. That is, when the assist torque is generated, the motor 11 may be controlled such that the rudder angle per time reaches the target angle within a range of a predetermined limit value, and when the rotational speed of the motor 11 is lowered, it is possible to decrease a displacement amount of the rudder angle per time by changing the limit value of the target angle from that at the time of normal control to lower the rotational speed.

When controlling the motor 11 based on the rudder angle in this manner, it is also possible to control based on the target angular speed. That is, when the EPS device 10 is allowed to generate the assist torque, it is possible to control the motor 11 such that an angular speed at the time of the rotation of the motor 11 reaches the target angular speed within a range of a predetermined limit value, and when lowering the rotational speed of the motor 11, it is possible to lower the rotational speed by changing the limit value of the target angular speed from that at the time of the normal control.

When lowering the rotational speed of the motor 11 by changing the limit value of the target current, the target angle, or the target angular speed in this manner, as in a case of changing the limit value of the applied voltage to the motor 11, it is also possible to store a predetermined limit value in advance in a storage unit 30 as in the steering device 1 according to the first embodiment or change the limit value according to the control gain of the VGRS device 62 as in the steering device 60 according to the second embodiment.

For example, when a predetermined limit value is stored as in the steering device 1 according to the first embodiment, the limit value at the time of the normal control to generate the assist torque and the limit value being the limit value with a limit amount smaller than that of the limit value used when the rotation of the motor 11 is slowed down are stored in advance in the storage unit 30 of the EPS control device 20. When the limit value is changed according to the control gain as in the steering device 60 according to the second embodiment, the limit value at the time of the normal control to generate the assist torque and the limit value being the limit value according to the control gain with the limit amount smaller than that of the limit value used when the rotation of the motor 11 is slowed down are stored in advance in the storage unit 30 of the EPS control device 20. When the EPS device 10 is allowed to generate the assist torque, the EPS device 10 is controlled with the limit value read for each control at the time of the normal control to generate the assist torque and at the time of the control to slow down the rotation of the motor 11. According to this, when the rotation of the motor 11 is slowed down, the rotational speed is lowered by the change in the limit value from that at the time of the normal control to generate the assist torque.

In a case in which the control to slow down the rotation of the motor 11 is changed to the normal control to generate the assist torque by a positional relationship between a wheel gear 16 and the worm gear 18, the limit value of the target current, the target angle, or the target angular speed the limit value is set to the limit value at the time of the normal control to generate the assist torque to cancel limitation. That is, when a tooth 19 of the worm gear 18 and a tooth 17 of the wheel gear 16 are brought into contact with each other in a state in which the rotational speed of the motor 11 is low and a time period in which the abnormal sound is generated elapses, the limit value is used for lowering the rotational speed of the motor 11 is set to the limit value at the time of the normal control to generate the assist torque. According to this, the limitation of the target current, the target angle, or the target angular speed is canceled and the normal control at the time of the generation of the assist torque is performed.

In the steering devices 1 and 60 according to the above-described first and second embodiments, when it shifts from the state in which the rotational speed of the motor is low to the normal control to generate the assist torque, it shifts by changing the limit value of the applied voltage to cancel the limitation; the limitation may be gradually canceled. That is, it is possible to gradually change the limit value of the applied voltage from the limit value when the rotational speed of the motor 11 is lowered to the limit value at the time of the normal control to generate the assist torque. According to this, rapid change in the assist torque may be inhibited and drivability may be improved.

In the steering devices 1 and 60 according to the above-described first and second embodiments, when the control to lower the rotational speed of the motor 11 is performed, it shifts to the normal control at the time of the generation of the assist torque when a time in which it may be determined that it passes the backlash elapses; however, it may also be determined whether it passes the backlash based on anything other than the time. For example, it is possible that a sensor capable of detecting a rotational angle of a side of the worm gear 18 and a side of the wheel gear 16 is provided and the control is shifted to the normal control when it reaches a state in which it may be recognized that the backlash of the worm gear 18 and the wheel gear 16 is filled up based on a detection result of the sensor. Alternatively, it is possible to shift to the normal control when the sensor which detects the rotational angle of the worm gear 18 detects that the worm gear 18 rotates by a predetermined angle after the control to slow down the rotation of the motor 11 is started. It may be determined that it passes the backlash after the control to lower the rotational speed of the motor 11 is started by a method other than the time as long as this is the method capable of appropriately determining.

In the steering devices 1 and 60 according to the above-described first and second embodiments, when the rotational speed of the motor 11 is lowered, this is lowered by the change in the limit value of the applied voltage and the like; however, this may be performed by method other than this. For example, it is possible to control without setting the limit value of the applied voltage and the like at the time of the normal control when the assist torque is generated, and control by setting the limit value when the rotational speed of the motor 11 is lowered to lower the rotational speed.

Although the control to lower the rotational speed of the motor 11 is not performed when the vehicle speed is not lower than a predetermined determination threshold value in the steering devices 1 and 60 according to the above-described first and second embodiments, it is also possible to configure not to start the control to lower the rotational speed when the driving of the motor 11 is started and the like based on another reference. For example, it is possible to configure not to start the control to lower the rotational speed of the motor 11 within a certain time from previous reverse. When the motor 11 is reversed in a short time, it is expected that rapid repetitive steering operation is performed to the steering 5. In this case, it is preferable to generate the assist torque as far as possible to assist the steering operation of the driver, so that, when an elapsed time from the previous reverse is not longer than a predetermined time, it is preferable to rapidly transmit power generated by the motor 11 to the shaft 41 to generate the assist torque without the control to inhibit the generation of the abnormal sound.

It is also possible to configure not to start the control to lower the rotational speed of the motor 11 also when a target speed being a target rotational speed when the motor 11 of the EPS device 10 is rotated is low. When the rotational speed of the motor 11 is low, the impact when the tooth 19 of the worm gear 18 and the tooth 17 of the wheel gear 16 separated by the backlash abut each other is small and the abnormal sound is also small, so that it is not necessary to perform the control to lower the rotational speed of the motor 11 when the target speed is not higher than a predetermined value.

Although it is determined whether the worm gear 18 stops or rotates based on a detection result of the rudder angle sensor 52 in the steering devices 1 and 60 according to the above-described first and second embodiments, it is also possible to determine the stop and the rotation of the worm gear 18. For example, it is possible to provide an angular speed sensor which detects the angular speed of the motor 11 and determine whether the worm gear 18 stops or rotates based on the angular speed of the motor 11 detected by the angular speed.

In the steering devices 1 and 60 according to the above-described first and second embodiments, a decelerator 15 is formed of the wheel gear 16 and the worm gear 18, rotational axes of which are orthogonal to each other, and the wheel gear 16 is used as a first gear operating based on the steering operation to the steering 5 and the worm gear 18 is used as a second gear engaging with the wheel gear 16 and capable of transmitting the power generated by the motor 11 to the wheel gear 16; however, the first and second gears may have another form. For example, a planetary gear mechanism is used or two spur gears or helical gears may be used as the first and second gears such that the rotational axes of the gears are parallel to each other. Regardless of the form of the gears, there is the backlash in a part in which the two gears engage with each other, so that it is possible to inhibit the impact at the time of contact of the teeth and inhibit the generation of the abnormal sound by lowering the rotational speed of the motor 11 when the teeth separated by the backlash are brought into contact with each other.

Although the EPS device 10 is provided as a column assist-type assist mechanism in the steering devices 1 and 60 according to the above-described first and second embodiments, the EPS device 10 may be of another type and may be a pinion assist type or a rack assist type, for example.

As the steering device, those used in the above-described first and second embodiments and each variation may be appropriately combined or that other than the above-described one may be used. Regardless of a configuration and a controlling method of the steering device, the steering device which generates the assist torque by using the power of the motor 11 and transmits the power generated by the motor 11 by the gear may inhibit the generation of the abnormal sound by making the rotational speed of the motor lower than that at the time of the normal operation when the driving of the stopped motor 11 is started or when the rotational direction is reversed.

REFERENCE SIGNS LIST 1, 60 STEERING DEVICE
5 STEERING (STEERING MEMBER)
10 EPS DEVICE
11 MOTOR
15 DECELERATOR
16 WHEEL GEAR (FIRST GEAR)
18 WORM GEAR (SECOND GEAR)
20 EPS CONTROL DEVICE
21 PROCESSOR
22 MOTOR CONTROLLER
23 DRIVE STATE DETERMINING UNIT
24 VEHICLE STATE OBTAINING UNIT
25 VEHICLE STATE DETERMINING UNIT
26 ROTATIONAL SPEED CONTROL SETTING UNIT
27 BACKLASH DETERMINING UNIT
30 STORAGE UNIT
41 SHAFT
42 GEAR MECHANISM
50 STATE DETECTING DEVICE
51 TORQUE SENSOR

52 RUDDER ANGLE SENSOR
53 VEHICLE SPEED SENSOR
62 VGRS DEVICE (VARIABLE OPERATING DEVICE)
65 VGRS CONTROLLER
66 CONTROL GAIN OBTAINING UNIT

The invention claimed is:

1. A steering device comprising:
a first gear configured to be connected to an output shaft which transmits an output to a turning wheel;
a second gear configured to engage with the first gear and capable of transmitting power generated by a motor to the first gear; and
a processor configured to control the motor, wherein
the processor makes a rotational speed of the motor lower than the rotational speed during normal operation when a tooth of the first gear is determined by the processor to abut a tooth of the second gear at a time when the motor is started by the processor from a stopped state or at a time when a rotational direction of the second gear is reversed by the processor.

2. The steering device according to claim 1, wherein
at a time when the rotational speed of the motor is lowered, a limit value of at least one of an applied voltage and a target current to the motor, and a target angle and a target angular speed at the time of rotation of the motor is changed to lower the rotational speed.

3. The steering device according to claim 1, wherein
the rotational speed of the motor is set to the rotational speed during the normal operation in at least one of following cases: an elapsed time from a previous reverse of the rotational direction of the second gear is not longer than a predetermined time, a vehicle speed is not lower than a predetermined vehicle speed, and a target rotational speed of the motor is not higher than a predetermined target speed.

4. The steering device according to claim 1, further comprising:
a variable gear ratio device configured to vary a gear ratio of the steering device based on a steering operation and an amount of the operation changes by a control gain, wherein
at a time when the rotational speed of the motor is lowered, a limit value of at least one of the rotational speed, an applied voltage, a target current, and a target angular speed of the motor is changed as the control gain changes.

5. The steering device according to claim 4, wherein
the control gain is a control gain of a VGRS or an ARS, or an angular feedback gain of the VGRS or the ARS, or a current feedback gain of the VGRS or the ARS.

6. The steering device according to claim 5, wherein
at the time when the rotational speed of the motor is lowered, a control value of at least any one of the rotational speed, the applied voltage, the target current, and the target angular speed of the motor is changed as a response speed of the VGRS or the ARS is higher or as the vehicle speed is lower.

7. The steering device according to claim 1, wherein
at a time when the rotational speed of the motor is lowered, a limitation of at least one of the rotational speed, an applied voltage, a target current, a target angle, and a target angular speed of the motor is canceled by a positional relationship between the first gear and the second gear or by an elapse of a predetermined time.

8. The steering device according to claim 2, wherein
the rotational speed of the motor is set to the rotational speed during the normal operation in at least one of following cases: an elapsed time from previous reverse of the rotational direction of the second gear is not longer than a predetermined time, a vehicle speed is not lower than a predetermined vehicle speed, and a target rotational speed of the motor is not higher than a predetermined target speed.

9. The steering device according to claim 2, further comprising:
a variable gear ratio device configured to vary a gear ratio of the steering device based on the steering operation and an amount of the operation changes by a control gain, wherein
at the time the rotational speed of the motor is lowered, the limit value of at least one of the rotational speed, the applied voltage, the target current, and the target angular speed of the motor is changed as the control gain changes.

10. The steering device according to claim 3, further comprising:
a variable gear ratio device configured to vary a gear ratio of the steer device based on the steering operation and an amount of the operation changes by a control gain, wherein
at the time when the rotational speed of the motor is lowered, a limit value of at least one of the rotational speed, an applied voltage, a target current, and a target angular speed of the motor is changed as the control gain changes.

11. The steering device according to claim 2, wherein
at the time when the rotational speed of the motor is lowered, a limitation of at least one of the rotational speed, the applied voltage, the target current, the target angle, and the target angular speed of the motor is canceled by a positional relationship between the first gear and the second gear or by an elapse of a predetermined time.

12. The steering device according to claim 3, wherein
at a time when the rotational speed of the motor is lowered, a limitation of at least one of the rotational speed, an applied voltage, a target current, a target angle, and a target angular speed of the motor is canceled by a positional relationship between the first gear and the second gear or by an elapse of a predetermined time.

13. The steering device according to claim 4, wherein
at the time when the rotational speed of the motor is lowered, a limitation of at least one of the rotational speed, the applied voltage, the target current, the target angle, and the target angular speed of the motor is canceled by a positional relationship between the first gear and the second gear or by an elapse of a predetermined time.

14. The steering device according to claim 5, wherein
at the time when the rotational speed of the motor is lowered, a limitation of at least one of the rotational speed, the applied voltage, the target current, the target angle, and the target angular speed of the motor is canceled by a positional relationship between the first gear and the second gear or by an elapse of a predetermined time.

15. The steering device according to claim 6, wherein
at the time when the rotational speed of the motor is lowered, a limitation of at least one of the rotational speed, the applied voltage, the target current, the target angle, and the target angular speed of the motor is canceled by a positional relationship between the first gear and the second gear or by an elapse of a predetermined time.

16. The steering device according to claim 1, wherein the first gear is a worm gear and the second gear is a wheel gear.

* * * * *